United States Patent [19]

Schneider

[11] Patent Number: 5,710,897
[45] Date of Patent: Jan. 20, 1998

[54] MANAGER FOR SELECTING A POINTER GRAPHICS FOLDER AND CUSTOMIZING POINTERS

[75] Inventor: Ira H. Schneider, Boca Raton, Fla.

[73] Assignee: International Business Machines Corporation, Armonk, N.Y.

[21] Appl. No.: 515,500

[22] Filed: Aug. 15, 1995

[51] Int. Cl.$^6$ .................................................. G06F 3/00
[52] U.S. Cl. ..................... 395/334; 395/349; 395/350; 345/145
[58] Field of Search ................................. 395/326–358; 345/156–172, 117–120, 145

[56] References Cited

U.S. PATENT DOCUMENTS 4,984,152  1/1991  Muller .................................. 345/157 X

OTHER PUBLICATIONS

Myers, "Taxonomy of Window Manager User Interfaces", IEEE Computer Graphics and Applications, pp. 65–84, Sep. 1988.
DeskSet Environment Reference Guide, Sun Microsystems, pp. 1–7, 189–211, Jun. 1990.
Change Cursor v2.21, J. Seidman, screen pp. 1–28, 1991.
Microsoft Windows User's Guide v2.0, Microsoft Corp., pp. 59–69, 95, 1987.
Mastering Windows 3.1, Sybex, pp. 16–17, 131, 694, 834–836, 1993.
Advanced Interface Design Guide, IBM, pp. 83–84, Jun. 1989.

*Primary Examiner*—Raymond J. Bayerl
*Assistant Examiner*—John E. Breene
*Attorney, Agent, or Firm*—Mark S. Walker; Andrew J. Dillon

[57] ABSTRACT

A pointer graphics manager is operating in a data processing system under a graphical user interface. The pointer graphics manager includes a pointer graphics editor for allowing an end user to edit the appearance of any of a plurality of pointer graphics displayed by the graphical user interface. Further, the graphics manager includes a pointer graphic selector for allowing the end user to select a change any of the individual pointer graphics or any set of pointer graphics within the plurality of pointer graphics. Within the pointer graphics, each pointer graphic represents a unique system operation and changes one from another depending upon the location of the device pointer while being displayed. Typically, the plurality of pointer graphics constitutes a device pointer file and are grouped as a pointer set. Several sets of pointer graphics are selectable by the pointer graphics selector. The pointer graphics manager further includes a default pointer set selector that allows the end user to restore any changed plurality of pointer graphics to a pre-edited condition or to a default set, whichever is desired by the user.

10 Claims, 14 Drawing Sheets

MANAGER FOR SELECTING A POINTER GRAPHICS FOLDER AND CUSTOMIZING POINTERS

BACKGROUND OF THE INVENTION

1. Technical Field

The present invention relates in general to pointing devices used in data processing systems and, more particularly, to modifiable device pointer graphics used in a data processing system. More particularly still, the present invention relates to the ability of a user to customize a mouse pointer where the end user may change the size and shape of the mouse pointer.

2. Description of the Related Art

Pointing devices for use with data processing systems, or computers, are well-known in the art. Such pointing devices have made computers easier to use by even the most computer-illiterate type user. Although there are several types of pointing devices, the most common pointing device is the mouse and its derivatives, for example, the track ball. What is common among all mouse-type pointing devices is that a screen icon, commonly referred to as a mouse pointer, is used to indicate the position of the mouse activity, which allows the user to select or interact with the computer system in a graphical manner.

Currently, the most typical mouse pointer is an arrow that points generally in a north by northwest direction. The tip of the mouse pointer is active such that when it is over an item of interest or going through a transition of some type, messages are sent to the processor within the computer to allow the system to respond to any user activity, such as depressing a mouse button or clicking any type of activation button with the pointing device.

Other types of mouse pointer graphics are displayed during other features. For example, while an application is being loaded, the pointer graphic may resemble some type of timing device indicating that a wait state is occurring and no activity is possible by the user. Additionally, if a user wishes to move a group file on the screen, a cross-shaped multi-arrow, which points in the north, south, east, and west directions, would be displayed. Additionally, if the user attempts to perform an invalid input, the pointer graphic might convert to a stop sign-type graphic, or the like, indicating that the type of input is forbidden.

Further still, other type of mouse pointer graphics are well-known such as when in a graphical user environment, files may be enlarged by either grabbing a corner or side or top or bottom bar and moving it until the desired window size has been obtained.

In the meanwhile, graphical user interfaces have become more and more customizable according to the user's tastes and interests. Unfortunately, this customization feature has not yet reached the mouse pointer graphics and the user is typically limited to only the standard mouse pointer graphics provided with the graphical user interface of choice.

Accordingly, what is needed is a mouse pointer graphics editor that allows a user to select from various different mouse pointer sets for different system operation occurrences and also allows the user to modify either the size or shape, or both, of each graphic according to the desire and intent of the user.

SUMMARY OF THE INVENTION

It is therefore one object of the present invention to provide pointing devices used in data processing systems.

It is another object of the present invention to provide modifiable pointing device pointer graphic used in a data processing system.

It is yet another object of the present invention to provide the ability of a user to customize a mouse pointer where the end user may change the size or shape, or both, of the mouse pointer.

The foregoing objects are achieved as is now described. According to the present invention, a pointer graphics manager for use in a data processing system operating under a graphical user interface is disclosed. The pointer graphics manager includes a pointer graphics editor for allowing an end user to edit the appearance of any of a plurality of pointer graphics displayed by the graphical user interface. Further, the graphics manager includes a pointer graphic selector for allowing the end user to select or change any of the individual pointer graphics or any set of pointer graphics within the plurality of pointer graphics. Within the pointer graphics, each pointer graphic represents a unique system operation and changes one from another depending upon the location of the device pointer while being displayed. Typically, the plurality of pointer graphics constitutes a device pointer file and are grouped as a pointer set. Several sets of pointer graphics are selectable by the pointer graphics selector. The pointer graphics manager further includes a default pointer set selector that allows the end user to restore any changed plurality of pointer graphics to a pre-edited condition or to a default set, whichever is desired by the user.

Since each pointer graphic represents a unique operation, the pointer graphics include a text pointer that is used only for text entry within a field in the graphical user interface. Additionally, a wait pointer is included that is only used when the data processing system cannot accept any input. Likewise, a size pointer, which may include one or more size pointers, is used when the device pointer moves over a particular corner of a sizable window displayed on the graphical user interface. Further, the plurality of pointer graphics includes a move pointer, which is used to indicate when a window can be moved, and an illegal pointer, which is used when an object is placed on the device pointer over an unacceptable location or operation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
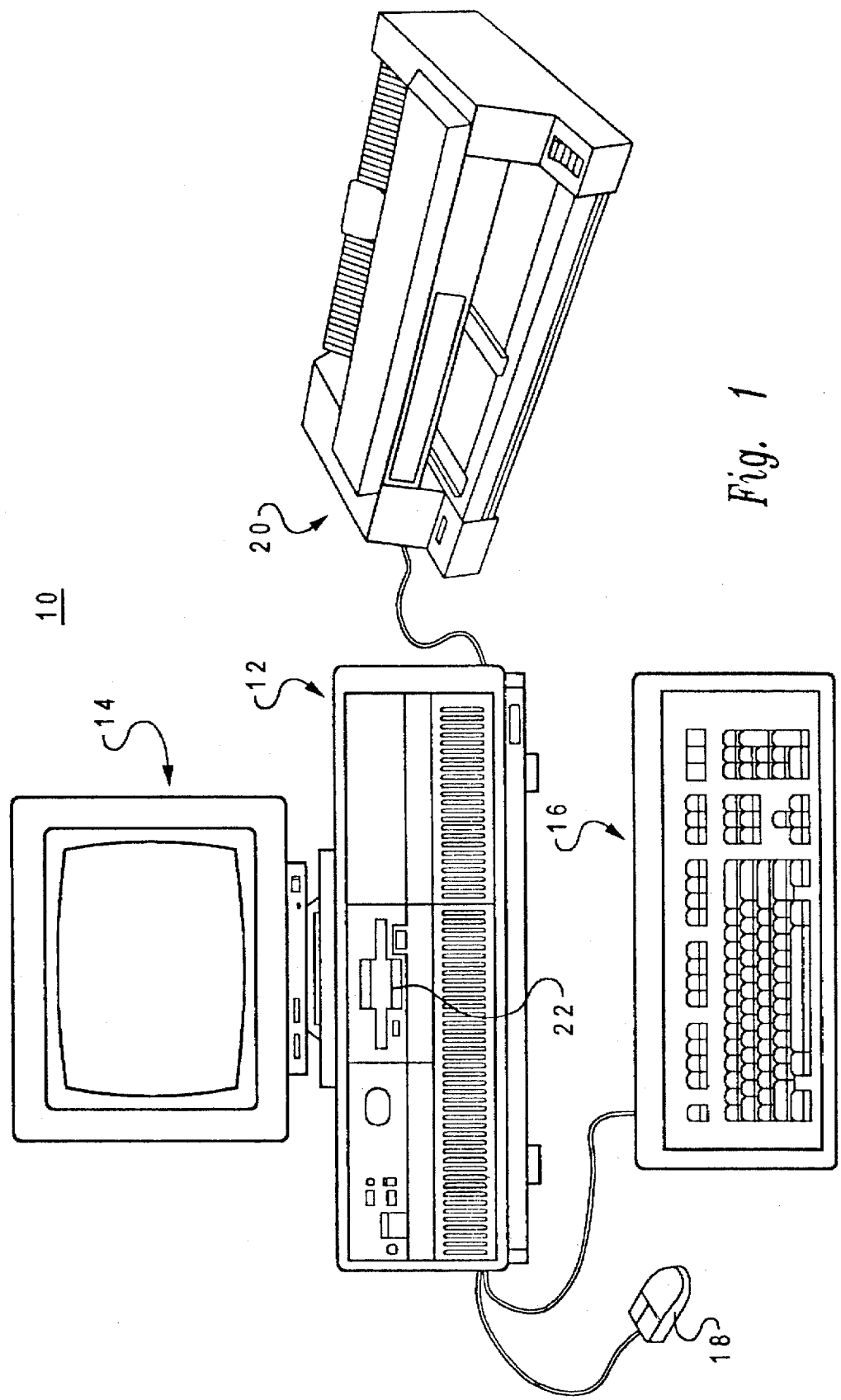
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22 or CDROM drive 23.

As will be described below, the system unit 12 responds to input devices, such as PC keyboard 16, the mouse 18, or local area networking interfaces. Additionally, input/output (I/O) devices, such as floppy diskette drive 22, display 14, printer 20, cd-rom drive 23, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2, or OS/2 Warp, operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
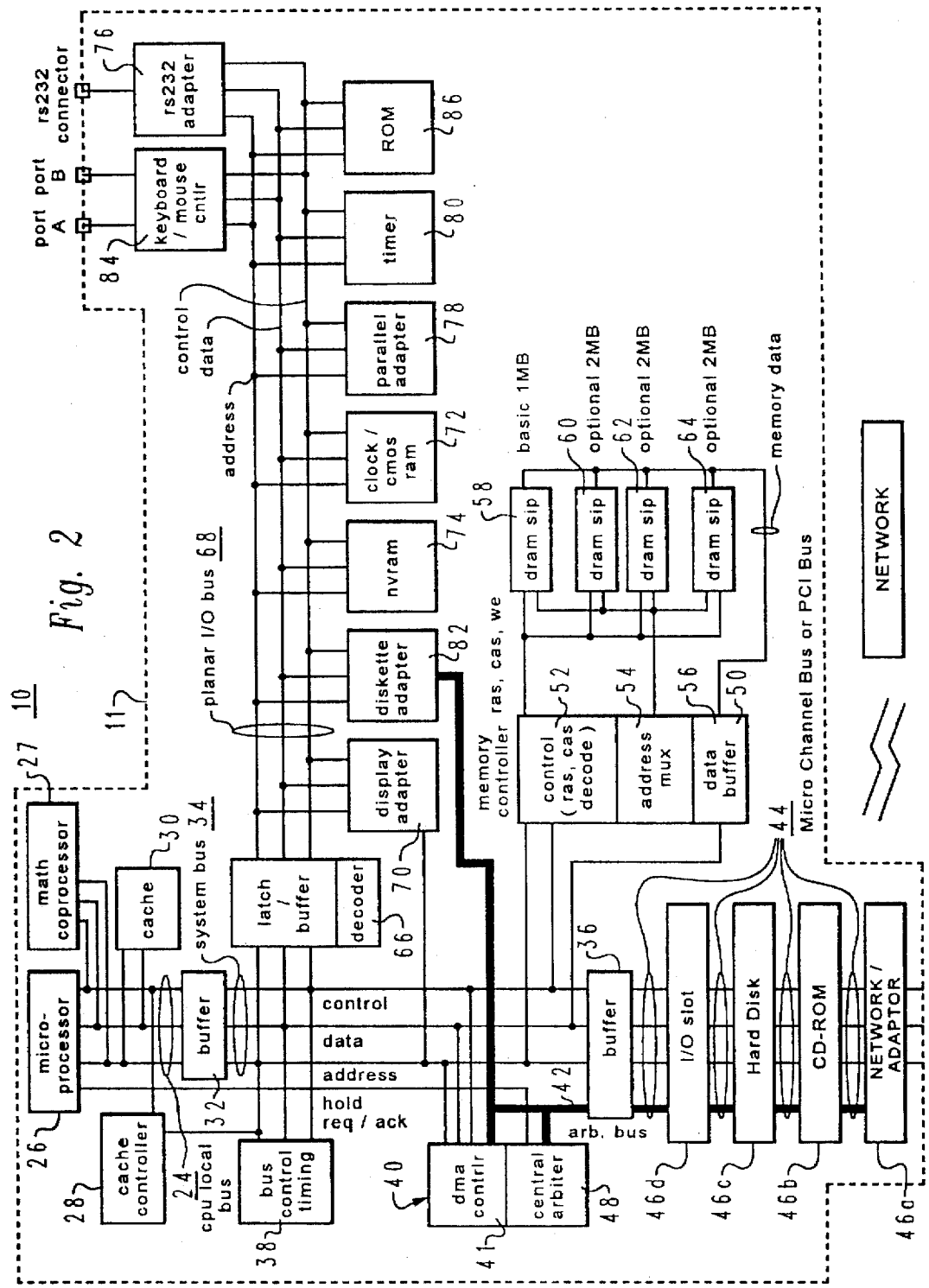
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the PowerPc family of microprocessors, which are sold by IBM. PowerPC is a trademark of IBM.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36 System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus such as a PCI or MicroChannel Bus 44. Connected to bus 44 are a plurality of I/O slots 46a–46d for receiving bus-compatible adapter cards, which may be further connected to an I/O device or memory. In the depicted example, I/O slot 46a has a hard disk drive connected to it; I/O slot 46b has a CD-ROM drive connected to it; and I/O slot 46c has a network adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

The operating system used in the computer of FIG. 1 is a graphical user interface type operating system that uses a pointing device to aid the user in manipulating operations viewed on the screen, but that represent computer implemented actions. The operating system of choice in the preferred embodiment is OS/2 Warp distributed by International Business Machines Corporation, but the present invention is applicable to any graphical user interface that typically uses pointer graphics with their appropriate pointer devices. It is not intended that the present invention be so limited to the OS/2 operating system environment.

Figure 3:
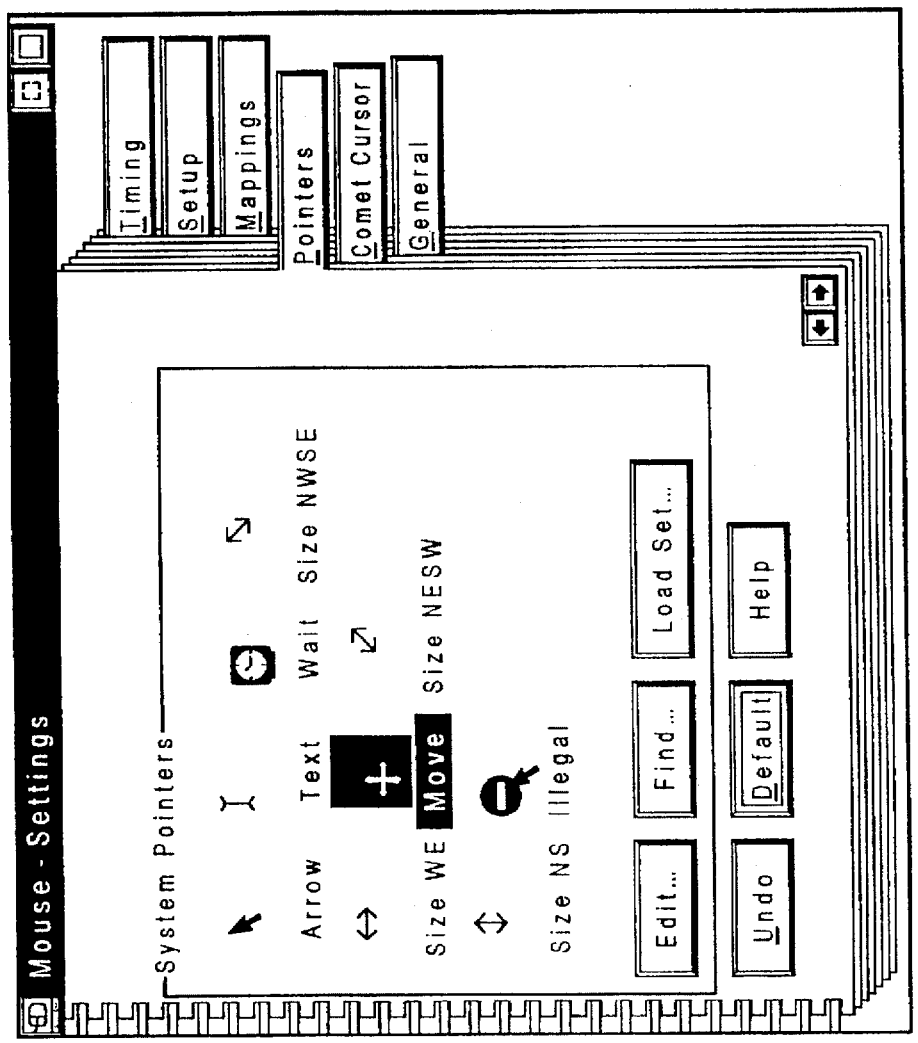
FIG. 3 depicts a graphical environment display on the monitor used in the computer system of FIG. 1.

Within the OS/2 operating system there are various different pointers defined for the various locations of the mouse on the screen. For instance, when the mouse pointer moves over a standard window, the normal arrow pointer is typically displayed. When the mouse passes over the sizing border of a window, a different mouse pointer is shown, indicated that the user can drag the sizing border to resize the window. FIG. 3 illustrates a graphical environment display on the monitor used in the computer system of FIG. 1. The display image is that of a Mouse Pointers Page within the OS/2 Warp operating system.

A plurality of mouse pointers are depicted within a System Pointers container and represent different events or mouse commands possible for the user to implement. There are at least nine mouse pointers with their associated graphics that are considered standard and constitute a "Pointer Set." Each pointer is stored in its own file having a filename with the postscript of ".PTR," which maybe modified or otherwise edited by the user. The first or main pointer is the arrow pointer, which has the file name "ARROW. PTR." This pointer's name is "arrow" and is normally the main mouse pointer used during most procedures.

The next pointer is the "text" pointer and its file name is "TEXT.PTR." It is the pointer used when the mouse is within any edit field. Moreover, it marks the cursor within the text to be edited. The "wait" pointer has a file name "WAIT.PTR" and is the pointer invoked when the system is busy. This mouse pointer is displayed when the system, or the window the mouse pointer is over, is busy and cannot accept any input. The "sizeNWSE" has a file name of "SIZENWSE.PTR" and is the pointer that is invoked when the mouse is moved over the upper left or lower right corner of a sizable window. The name of this pointer indicates the orientation of the default mouse pointer and is a double-headed arrow pointing to the top left and bottom right corners of the screen, indicating the directions in which the user can drag the sizing border of the window. The "NW" represents the northwest while the "SE" represents the southeast.

The next pointer is the "sizeWE" pointer and has a file name of "SIZEWE.PTR." This is the mouse pointer that the user sees when the user moves the mouse over the left or right border of a sizable window. The name of this pointer, "size west to east" indicates the orientation of the default mouse pointer and has a double-headed arrow pointing left and right, thereby indicating the direction in which the user can drag the sizing border of the window.

The next pointer file is MOVE.PTR and is the move pointer used in some application programs, such as the Dialog Editor that comes with the OS/2 programmers tool kit, indicating that the user can move a window. This pointer is not used by the OS/2 graphical user interface Workplace Shell. The next pointer is also a pointer used in resizing a sizable window and it is the "sizeNESW" pointer having a file name "SIZENESW.PTR." This pointer allows a user to see when the user moves the mouse over the upper right or lower left corner of a sizable window. The name of this pointer "size Northeast to Southwest", indicates the orientation of the default mouse pointer, which is a double-headed arrow pointing to the top right and bottom left corners of the screen, and indicates the direction in which the user can drag the sizing border of the window.

The next resizing pointer graphic is the "SIZE NS" pointer and has a file name of "SIZENS.PTR." It is the mouse pointer the user sees when the user moves the mouse over the top or bottom border of a sizable window. The name of this pointer "size North to South" indicates the orientation of the default mouse pointer, which is a double-headed arrow pointing up and down, and indicates the direction in which the user can drag the sizing border of the window. The last standard mouse pointer graphic is the "illegal" mouse pointer graphic, which has a file name "ILLEGAL. PTR" and is the pointer seen by the user when the user tries to drag an object over a particular place where the user cannot drop that particular object. For example, if a user tries to drag a non-printable object over a printer icon, the user would see this illegal mouse pointer graphic.

Figure 5:
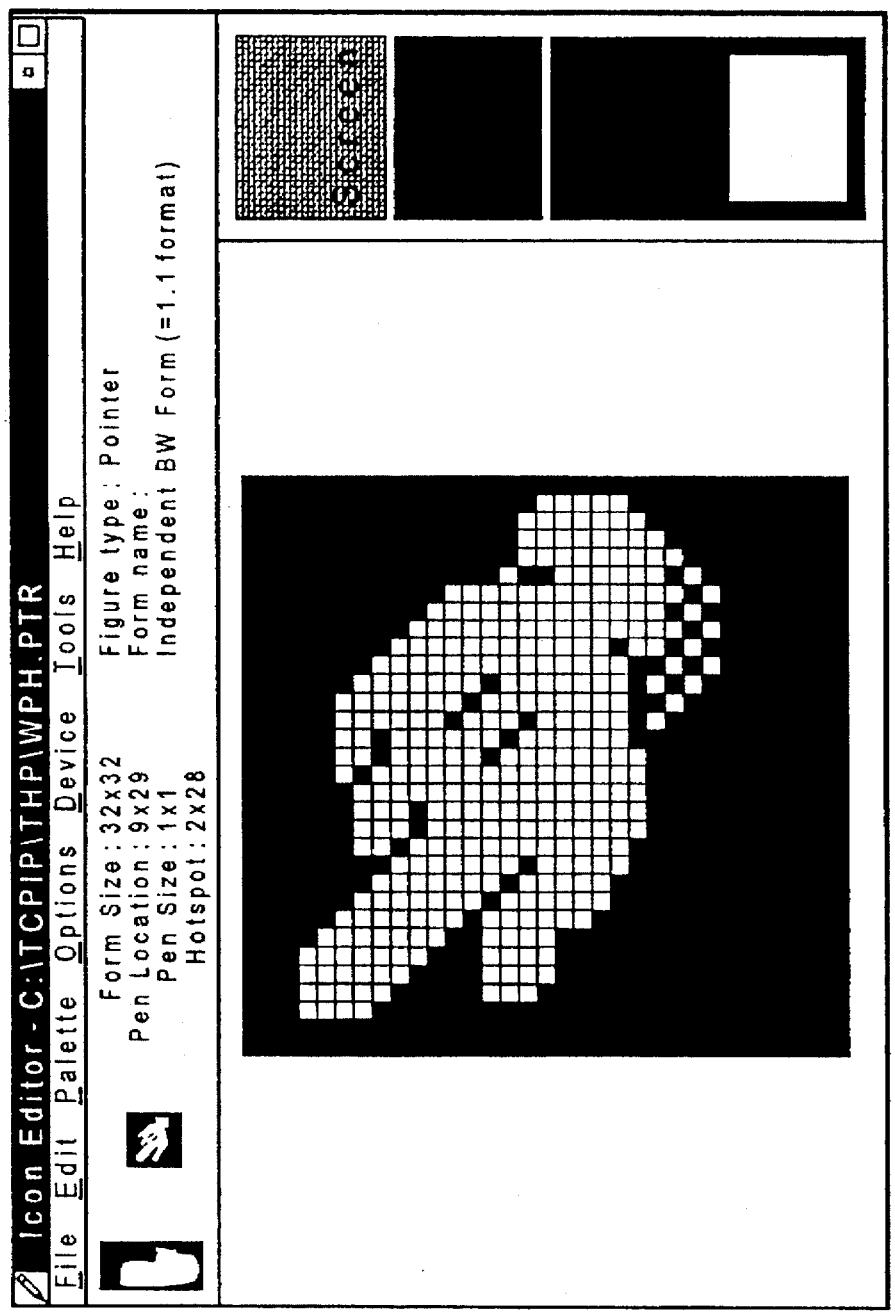
FIG. 5 depicts the icon editor field for editing a pointer.

The systems pointers container in FIG. 3 displays the current mouse pointer set being used by the system. A Pointer Set is a folder containing pointer definitions, which are modifiable. There are two ways to change the pointer definitions. The first method is for the user to move the mouse pointer over the picture of the pointer desired to change and double click the first mouse button, typically the left mouse button for a right-handed use. This action invokes the Icon Editor for the selected pointer, as shown in FIG. 5. When the user leaves the Icon Editor, the changed mouse pointer is made into the current pointer. The second method is where the user selects the pointer by single clicking on the pointer in the system pointers area and then pressing the Edit . . . pushbutton. This action also invokes the Icon Editor for the specified pointer.

Unfortunately, directly editing the mouse pointers in the system pointers area does not preserve a copy of the changed pointers anywhere the user can access. This means that a user who wants to move to another system cannot take the customized pointers to that new system; in other words, the user will have to recreate the pointers as changed. Also, if the user wants to restore some, but not all, of the original pointers, the user does not have any way to selectively store these customizations. Using pointers sets, as described below, allows the user to overcome these limitations.

Figure 6:
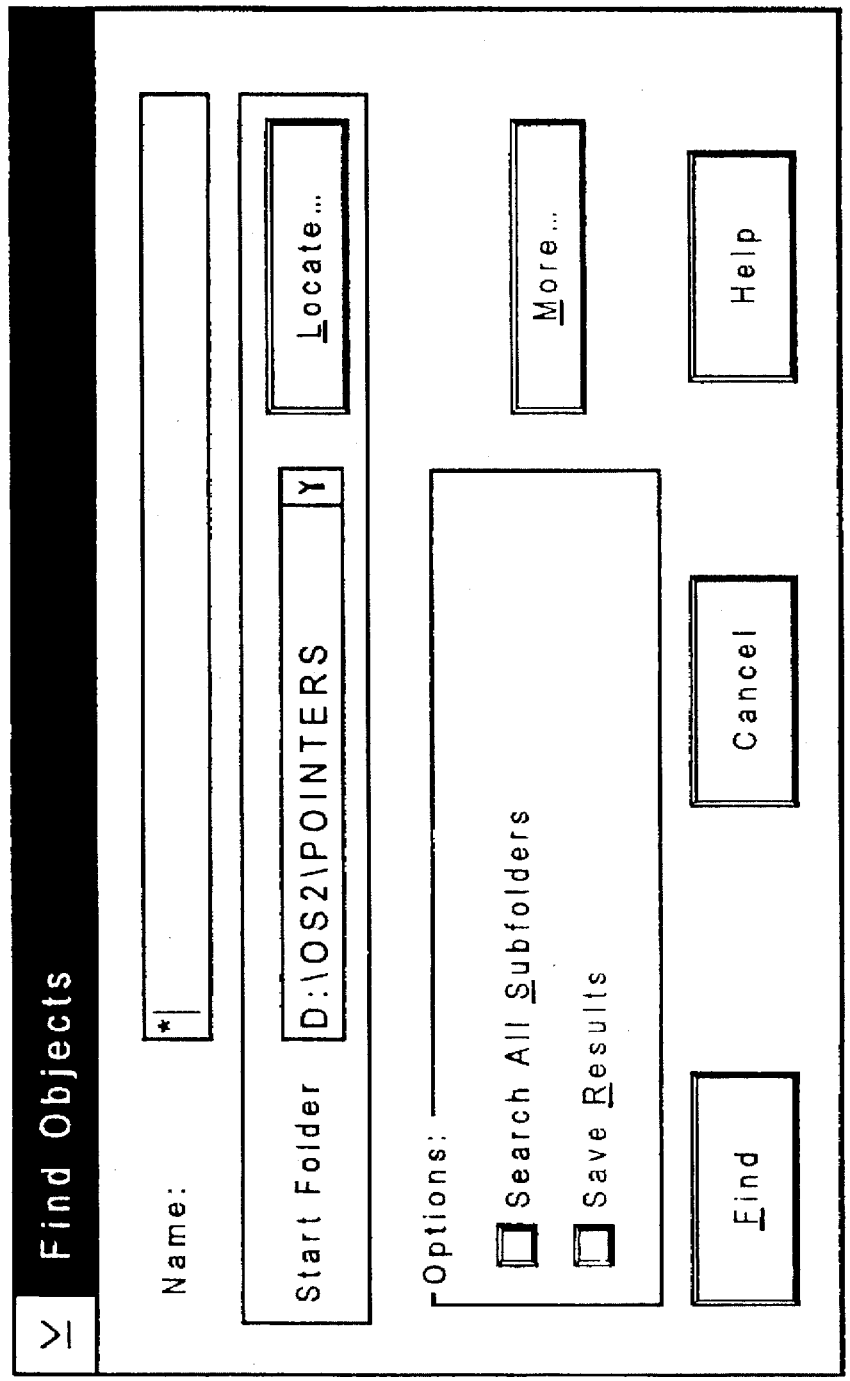
FIG. 6 is the Find Objects dialog box from which the user can specify where to look for pointer objects.

A user can also replace a single pointer by selecting the pointer in the system pointers area and then pressing the Find . . . pushbutton. This displays the Find Objects dialog box, shown in FIG. 6, from which the user can specify where to look for pointer objects. These objects must be files that have the .PTR file extension. The default directory in the OS/2 operating system is/OS2/POINTERS on the boot drive. This directory contains several pointers that the user can choose and is the anchor point for the pointer sets.

Figure 7:
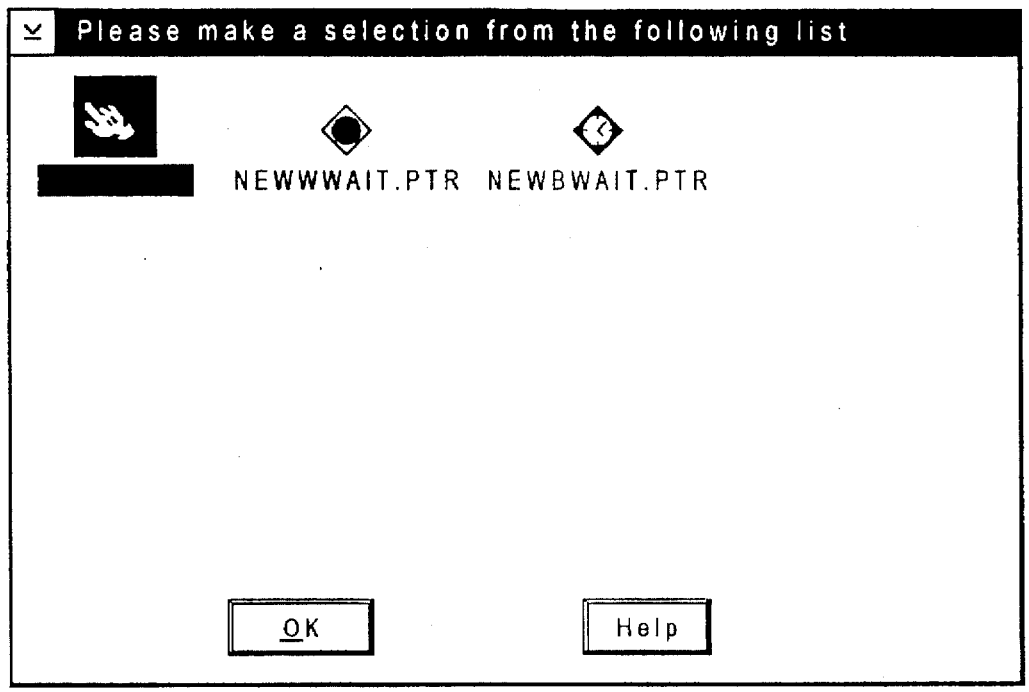
FIG. 7 depicts the Find Results container.

The user views the available pointers and if the user finds a pointer to his liking, the user only has to select the pointer in the Find Results container and push on the Okay pushbutton. The pointer the user chooses will replace the selected mouse pointer. If the user fails to find a suitable pointer object, the user double clicks on the system menu for the Find Results container, which is shown in FIG. 7 and the mouser pointer will not be changed.

Three other edit commands or pushbuttons are available to the user in the pointer settings page. These include LoadSet . . . , Undo, and Default. The LoadSet . . . pushbutton allows a user to replace multiple pointers from a pointer set. The Undo pushbutton restores all of the mouse pointers to what they were when the mouse pointers page was first opened. This discards any changes made by the user beforehand. The Default pushbutton restores all the mouse pointers to their default appearances as currently shown in FIG. 3. This removes all changes the user may have ever made to the mouse pointers.

A pointer set is simply a folder that contains one or more pointer objects. The pointers in a pointer set can be used to replace the current system pointers. Each pointer file in the pointer set is associated to the corresponding system pointers by the names of the pointer files. The files in the pointer set must conform to the naming convention stated earlier and include the .PTR extension. The user invokes the pointer file in order to replace or otherwise change the existing mouse pointer graphic with a different mouse pointer graphic. An alternative pointer set is shown in FIG. 4.

Figure 4:
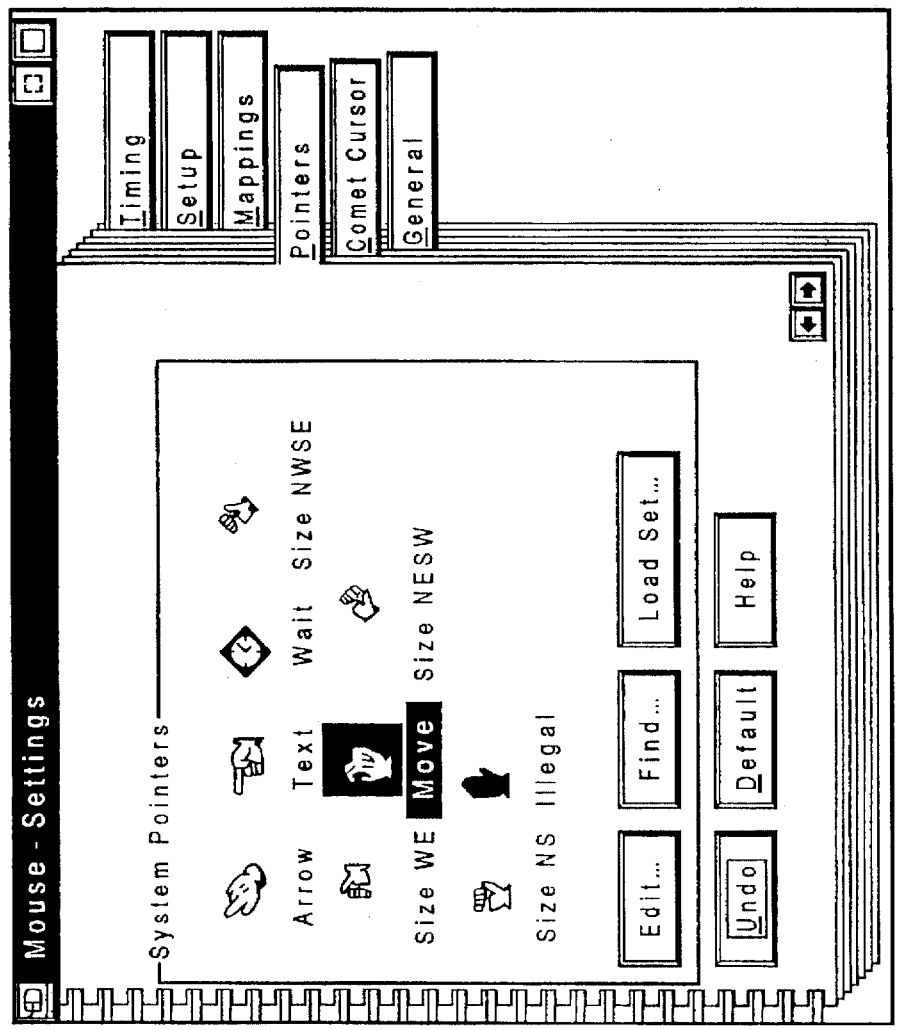
FIG. 4 is an alternative pointer set.

If a user presses the Load Set . . . pushbutton, the user in presented with the load pointer set dialog box, which is shown in greater detail in FIG. 4. The Load Pointer Set dialog box contain a list of the pointer sets known to the system. The user then chooses one of the pointer sets by double clicking on its name or by single clicking on its name and then pressing the Load pushbutton.

When the user loads a pointer set, the system replaces the current system pointers with the corresponding validly defined pointers within the pointer set. If no pointer object corresponding to a system pointer is defined in the pointer set, the system pointer is not changed. This does not mean that the system pointer is reset to its default value, it merely means that it is not affected by the load pointer set operation.

Figure 8:
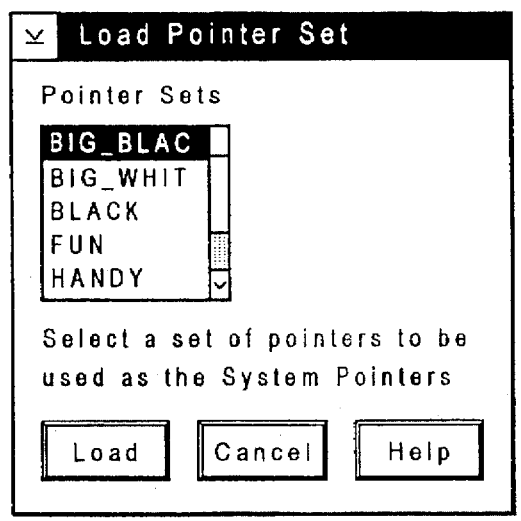
FIG. 8 is a sample load pointer set operation.

The user can also build his own pointer sets. Pointer sets reside in the OS/2 pointers directory on the boot drive. FIG. 8 depicts a sample load pointer set operation. The user opens the/OS2/POINTERS folder, creates a new folder to hold the pointer set, and populates the pointer set folder with the pointer objects that follow the required naming convention described above. The user may also copy existing pointers into the pointer set folder or create new pointer objects using the icon editor. An example of an edited pointer is shown in FIG. 5.

The icon editor allows a user to build an object that serves as a pointer. Within the pointer object is a hotspot for each pointer created. The hotspot is the actual pixel within the pointer that indicates where the mouse is pointing. For example, for the normal move pointer, the hotspot is the tip of the arrow.

While editing pointers, the user can generate pointers that use either 16 colors or are black and white. If the pointers created contain only black and white, which is the color used in this default pointer set, the user would select the BW form for the pointer.

Figure 9:
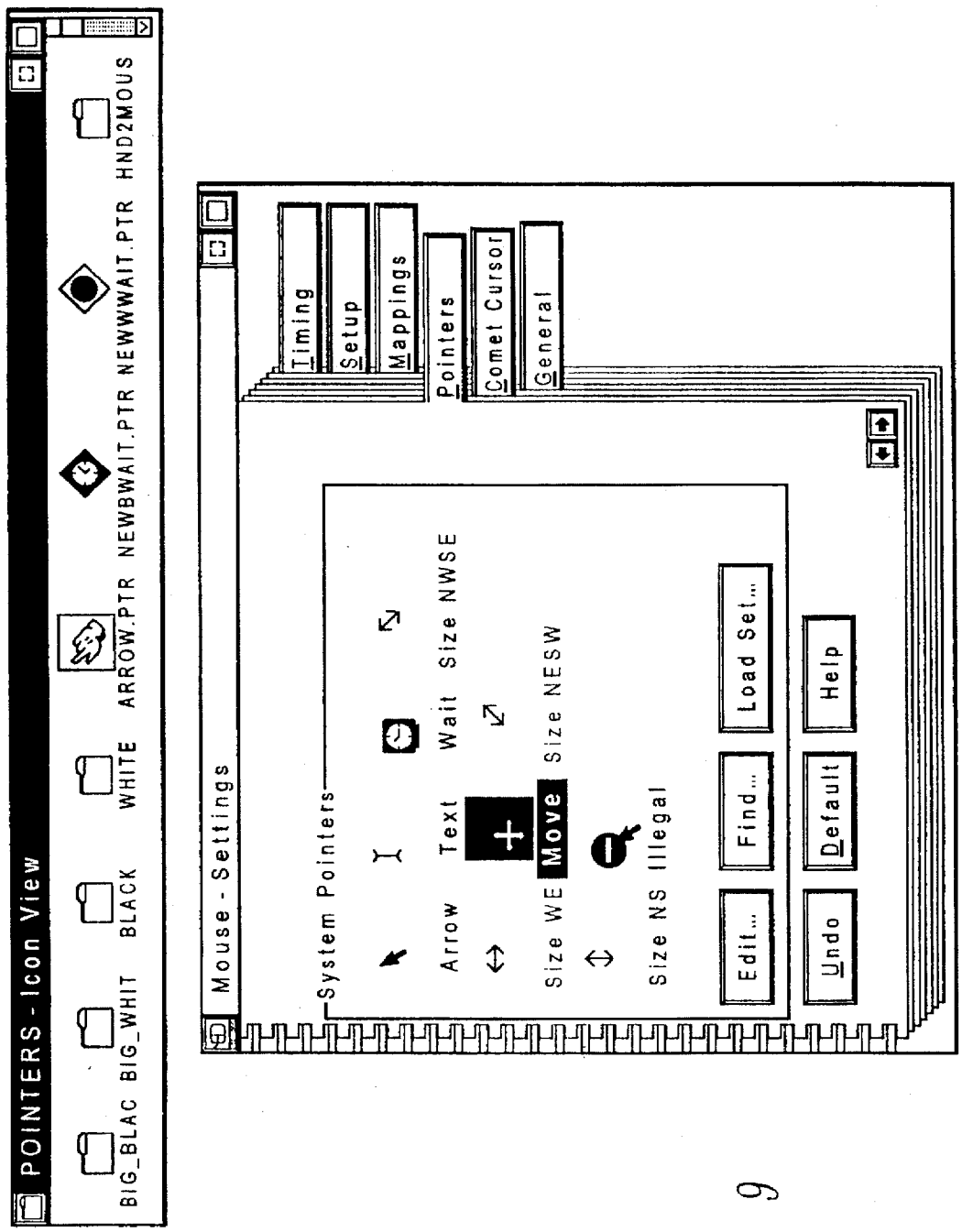
FIG. 9 depicts using the pointer's page by which the user may customize the mouse pointers.
Figure 10:
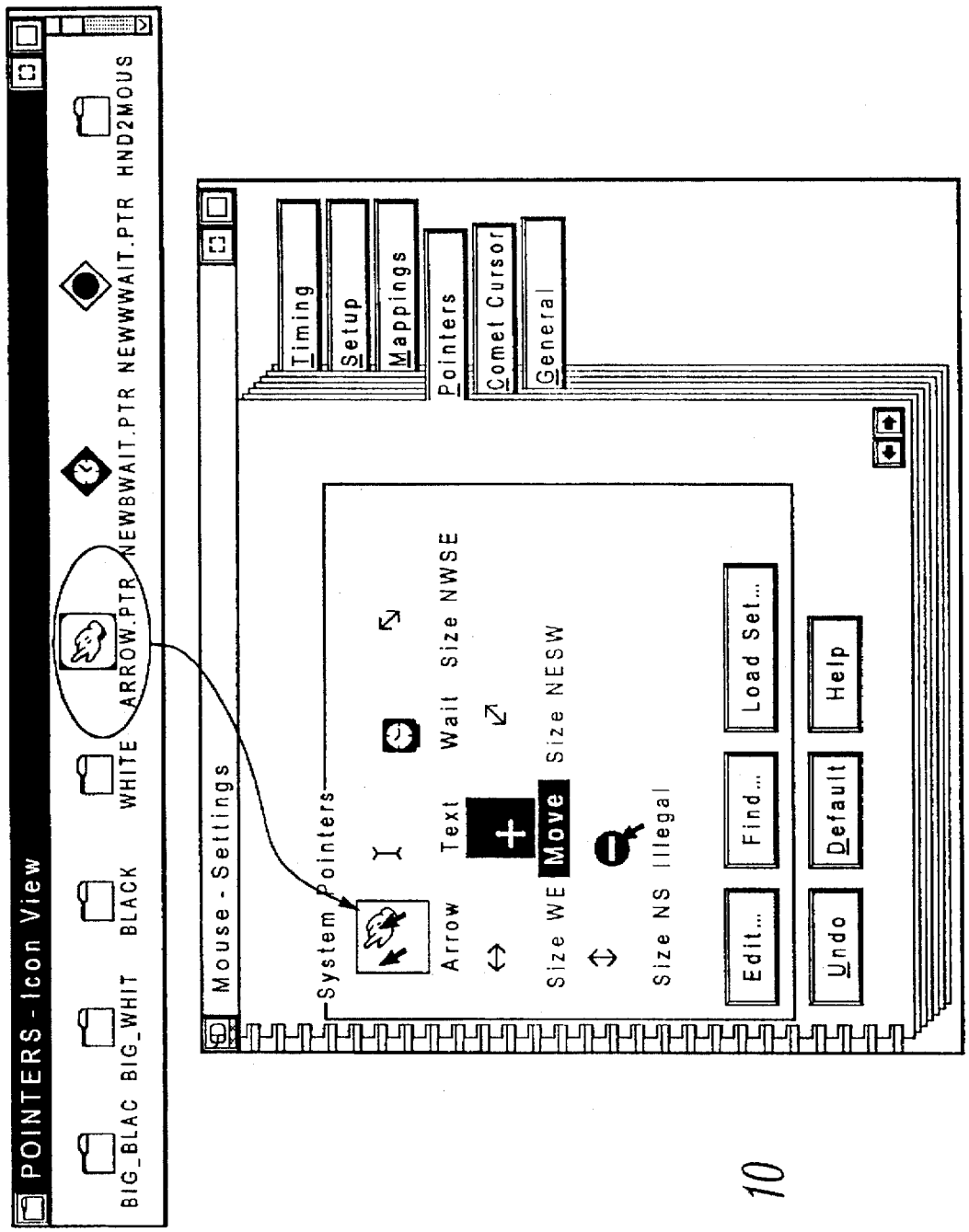
FIG. 10 is the system pointers area of the pointer's page by which the user can open a folder containing a mouse pointer that the user desires to use.
Figure 11:
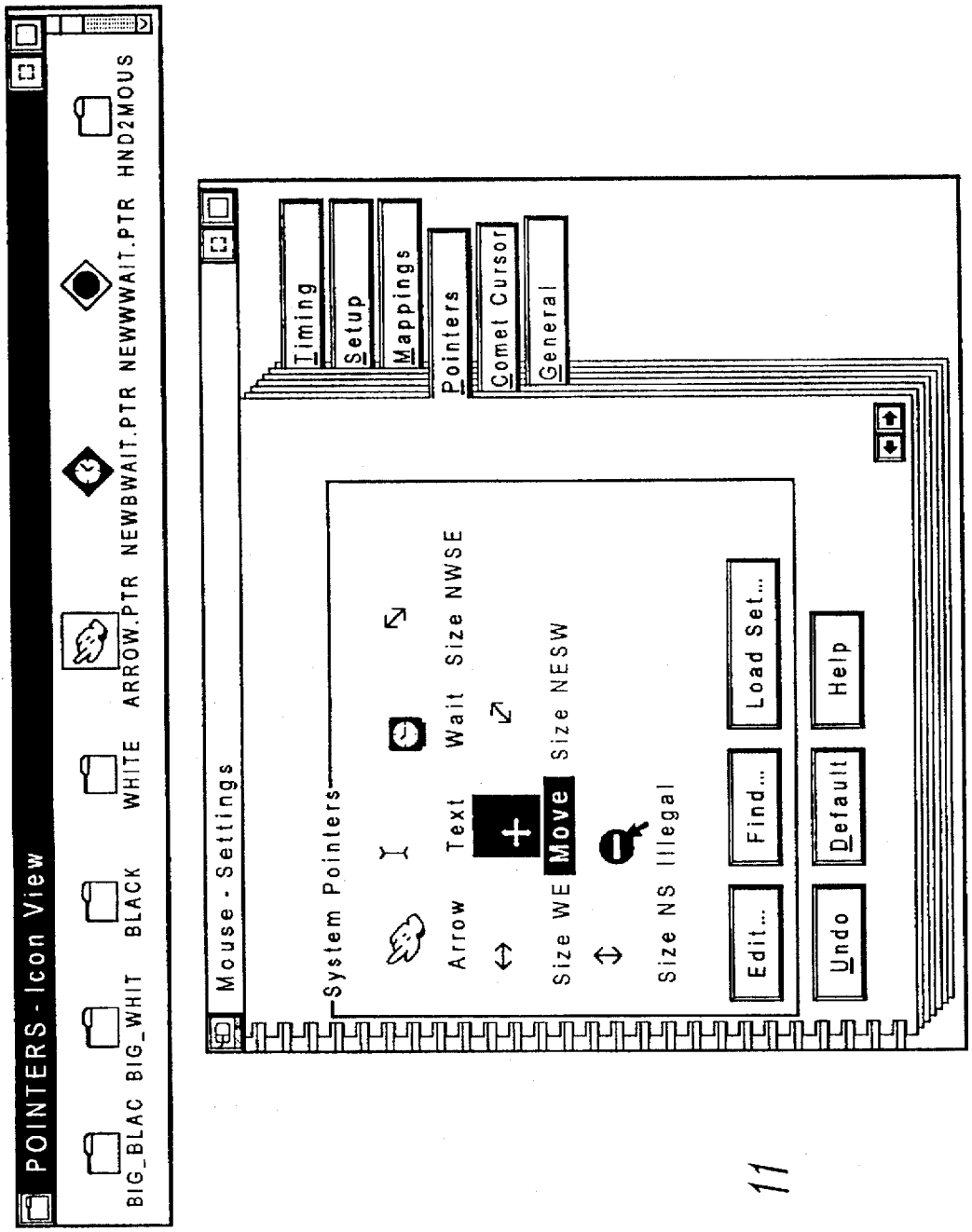
FIG. 11 depicts one of the pointers in the system pointer's area that changes the corresponding system pointer.

Alternatively, the user may customize the mouse pointers by using the pointer's page shown in FIG. 9. The user then opens a folder containing a mouse pointer that the user desires to use and drags it into the system pointers area of the pointer's page, as illustrated in FIG. 10. Then, the user drop a single pointer object on top of one of the pointers in the system pointer's area which then changes the corresponding system pointer, which is illustrated in FIG. 11.

Figure 12:
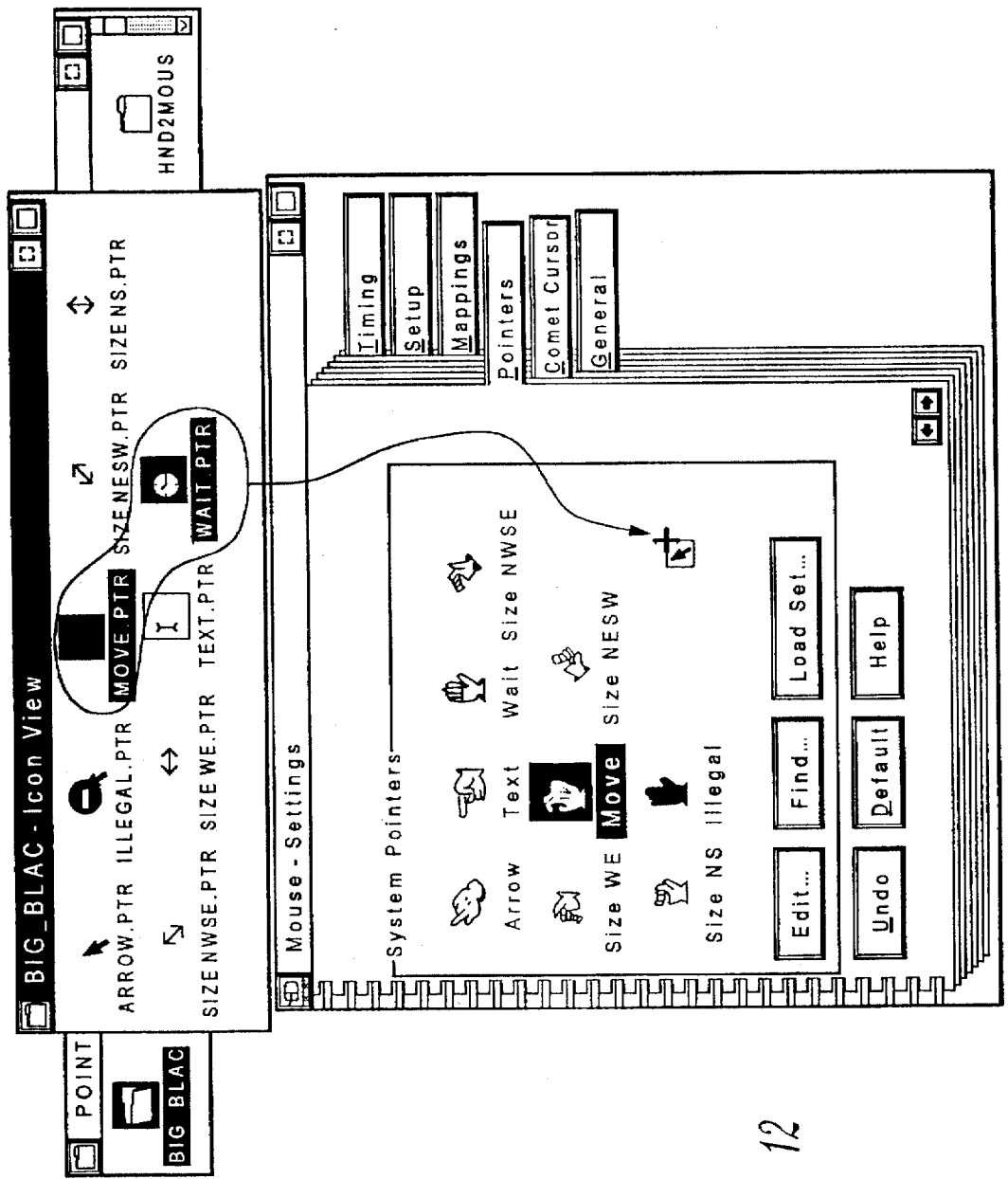
FIG. 12 is the system pointers area where several pointers are moved to change pointer graphics.
Figure 13:
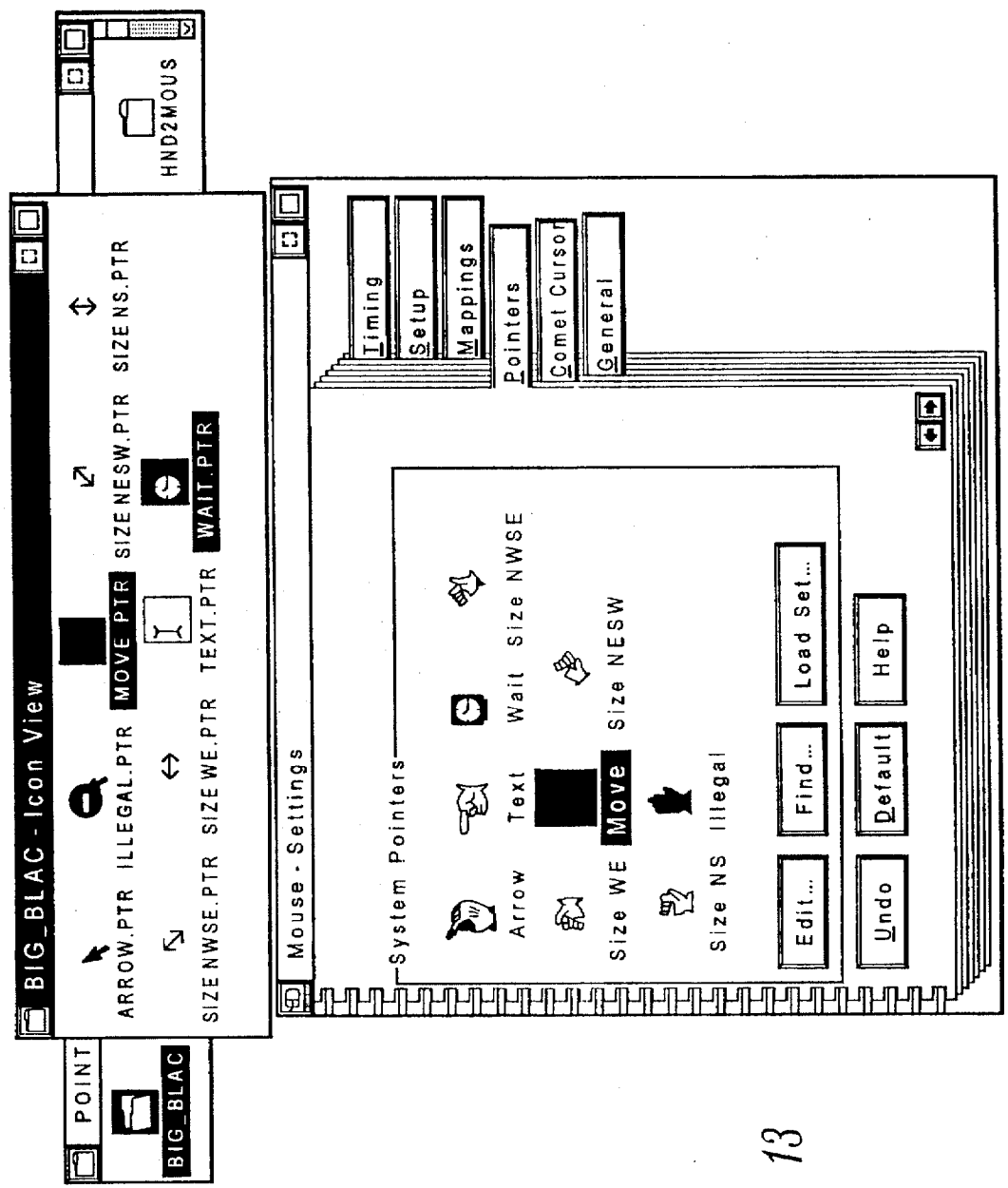
FIG. 13 depicts the object that conform to the naming convention used for pointer sets use the corresponding system pointers of FIG. 12.

The user might also drag and drop one or more pointer objects, meaning that multiple pointer objects may be selected and dragged as a group, into an unoccupied space within the system pointer's area. FIGS. 12 and 13 illustrate this by moving the MOVE.PTR and WAIT.PTR files to the System Pointers window. The objects that conform to the naming convention used for pointer sets use the corresponding system pointers (FIG. 13).

Figure 14:
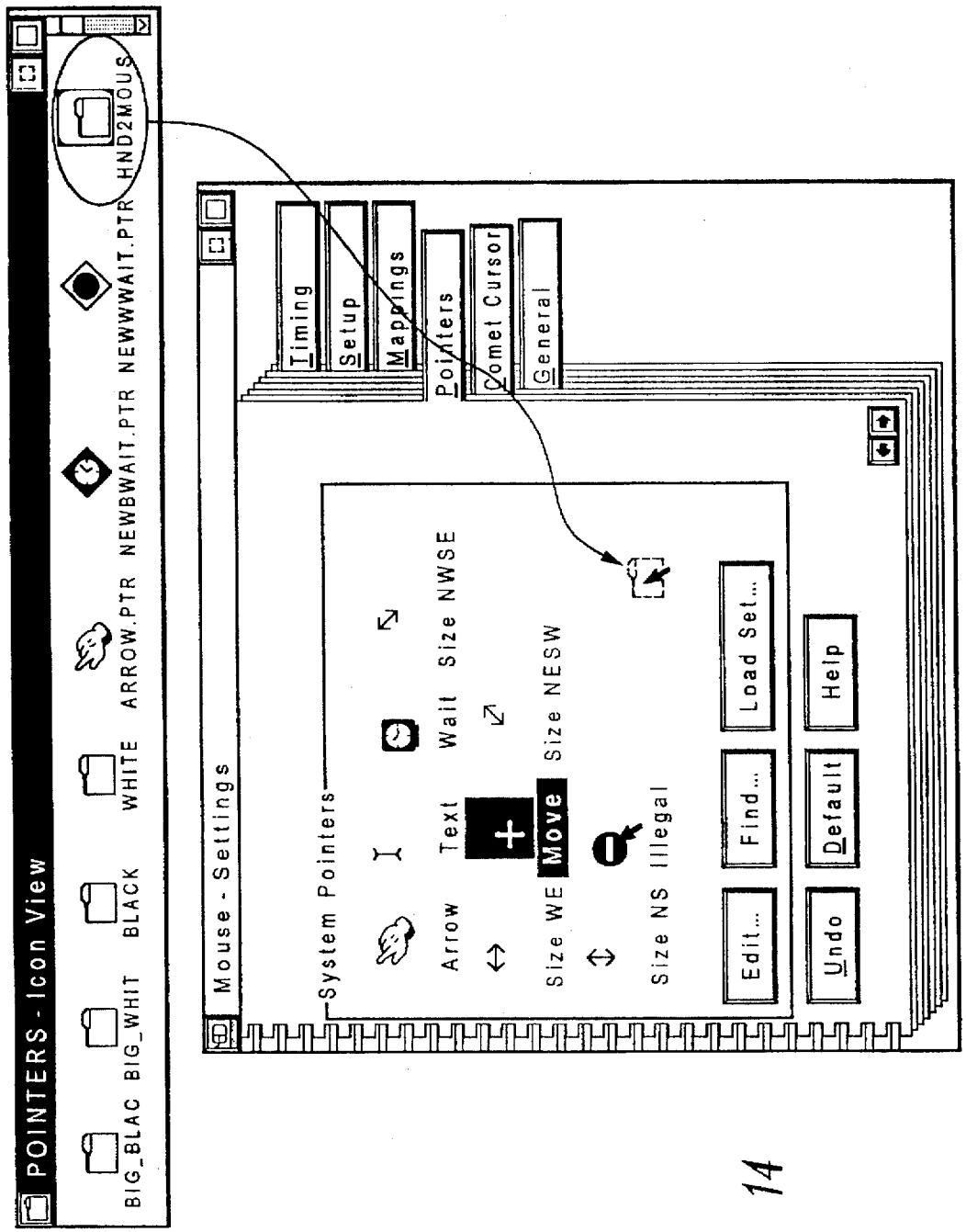
FIG. 14 is an illustration of moving the HND2MOUS folder to the pointer page.
Figure 15:
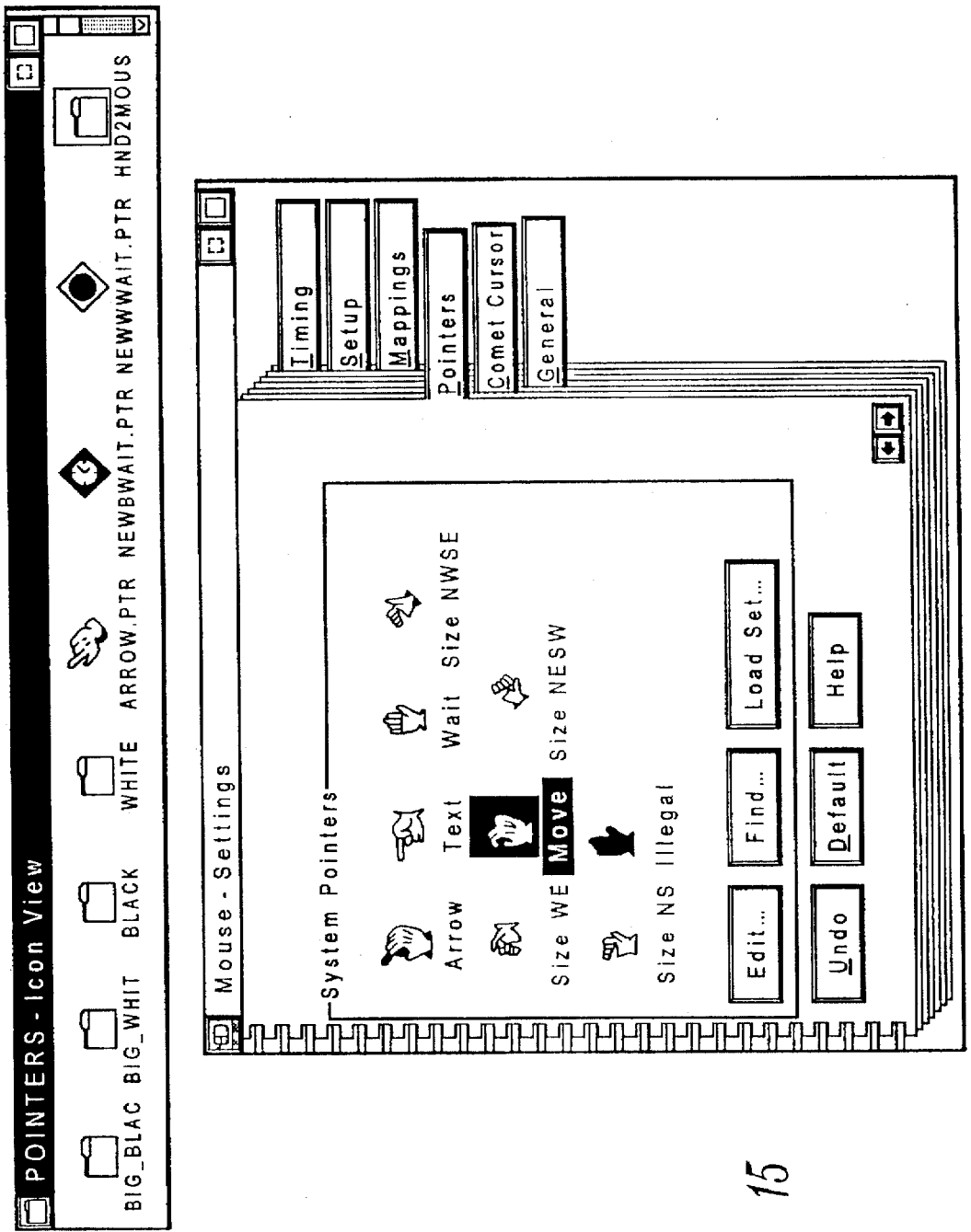
FIG. 15 depicts the folder taken from FIG. 14 to be a pointer set and all pointer objects within the folder that conform to the pointer set name convention, which replaces each corresponding system pointer.

Lastly, the user can drag and drop the icon representing a folder, such as the HND2MOUS folder shown in FIG. 14 into an unoccupied space within the systems pointers area. The folder is taken to be a pointer set and all pointer objects within the folder that conform to the pointer set name convention replace the corresponding system pointers, which is shown in FIG. 15.

What has been described is a pointer graphics manager for allowing a user to customize the system pointers within a graphical user interface by building a custom pointer set containing pointer objects that are gathered by the user from various sources and then loading that pointer set for use. Further, what has been shown is the capability of a user to modify the mouse pointers, which allows the user to customize the graphical user environment to satisfy the users requirements. For example, the user or a third party vendor could provide a set of left handed mouse pointers, which would be more natural looking for a left handed user. Additionally, larger than standard mouse pointers may be provided that make it easier to see the pointer on a small display or for a sight impaired person who needs larger text and mouse pointers to see things well.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms; including, but not limited to: (a) information permanently stored on non-writable storage media (e.g. read only memory devices within a computer such as ROM 86 or CD-ROM disks 46b readable by a computer I/O attachment); (b) information alterably stored on writable storage media (e.g. floppy disks 22 and hard drives 46a; or (c) information conveyed to a computer through communication media such as network 46c and telephone networks via a modem. It should be understood, therefore, that such media, when carrying computer readable instructions that direct the method functions of the present invention represent alternate embodiments of the present invention.

While the invention has been particularly shown and described with reference to a preferred embodiment, it will be understood by those skilled in the art that various changes in form and detail may be made therein without departing from the spirit and scope of the invention.

I claim:

1. In a data processing system operating under a graphical user interface, which provides for a device pointer operable on said data processing system, said device pointer having a plurality of pointer graphics, which each represents a unique system operation and changes one from another depending upon the location of said device pointer, a pointer graphics manager comprising:

a pointer graphics editor whereby an end-user can edit the appearance of any of said plurality of pointer graphics displayed by said graphical user interface;

a plurality of folders, each of said plurality of folders containing a set of pointer graphics; and a pointer graphics selector for selecting a particular one of said plurality of folders and for automatically utilizing a set of pointer graphics contained therein for said device pointer for each unique system operation wherein an end-user can select an entire set of pointer graphics by selecting a single folder among said plurality of folders.

2. The invention of claim 1 wherein said device pointer is a mouse pointer.

3. The invention of claim 1 wherein one of said plurality of pointer graphics is a text pointer used only within an entry field of said graphical user interface.

4. The invention of claim 1 wherein one of said plurality of pointer graphics is a wait pointer used only when said data processing system cannot accept any input.

5. The invention of claim 1 wherein one of said plurality of pointer graphics is a size pointer used when said device pointer device moves over an upper-left or lower-right corner of a sizeable window.

6. The invention of claim 1 wherein one of said plurality of pointer graphics is a size pointer used when said device pointer device moves over an upper-right or lower-left corner of a sizeable window.

7. The invention of claim 1 wherein one of said plurality of pointer graphics is a size pointer used when said device pointer device moves over a right or left border of a sizeable window.

8. The invention of claim 1 wherein one of said plurality of pointer graphics is a size pointer used when said device pointer device moves over a top or bottom border of a sizeable window.

9. The invention of claim 1 wherein one of said plurality of pointer graphics is a move pointer used to indicate when a window can be moved.

10. The invention of claim 1 wherein one of said plurality of pointer graphics is an illegal pointer used when an object is placed with said device pointer over an unacceptable location.

* * * * *